US012801497B2

(12) United States Patent
Choudhary et al.

(10) Patent No.: US 12,801,497 B2
(45) Date of Patent: Nov. 17, 2026

(54) MULTI-CORE CLUSTER PROCESSING FOR SECURE SAVE AND RESTORE OPERATIONS DURING DEEP SLEEP POWER STATE

(71) Applicant: QUALCOMM Incorporated, San Diego, CA (US)

(72) Inventors: Dinesh Kumar Choudhary, Tonk (IN); Maulik Shah, Hyderabad (IN); Srinivas Rao Lengamaneni, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/965,843

(22) Filed: Dec. 2, 2024

(65) Prior Publication Data

US 2026/0154159 A1 Jun. 4, 2026

(51) Int. Cl.
*G06F 11/00* (2006.01)
*G06F 11/14* (2006.01)
*G06F 21/57* (2013.01)

(52) U.S. Cl.
CPC ...... *G06F 11/1417* (2013.01); *G06F 11/1407* (2013.01); *G06F 21/572* (2013.01)

(58) Field of Classification Search
CPC .......................... G06F 11/1417; G06F 11/1407
See application file for complete search history.

(56) References Cited

U.S. PATENT DOCUMENTS 5,428,779 A * 6/1995 Allegrucci .............. G06F 9/463 712/228
9,037,808 B2 * 5/2015 Suzuki ................ G06F 12/0804 713/324
9,063,794 B2 * 6/2015 Morita ................ G06F 9/45533
9,383,801 B2 * 7/2016 Branover .............. G06F 1/3234
9,898,298 B2 * 2/2018 Offen .................. G06F 15/7871
10,884,481 B2 * 1/2021 Nguyen ................ G06F 1/3287
2004/0025045 A1 * 2/2004 Chan ........................ G06F 21/57 726/16
2007/0157045 A1 7/2007 Gu et al.
2007/0162640 A1 7/2007 Johns et al.
(Continued)

FOREIGN PATENT DOCUMENTS

CN 102033600 A * 4/2011 ........... G06F 1/3203
CN 102033600 B * 7/2014 ........... G06F 1/3203
(Continued)

OTHER PUBLICATIONS

International Search Report and Written Opinion—PCT/US2025/056001—ISA/EPO—Mar. 12, 2026.

*Primary Examiner* — Amine Riad
(74) *Attorney, Agent, or Firm* — Seyfarth Shaw LLP

(57) ABSTRACT

A multi-core cluster computing method for securely saving and restoring context data includes storing, by a last core in a primary cluster, last core context data in a first memory. The method also includes storing, by a secondary core in a secondary cluster, secondary core context data in a second memory. The method further includes entering, by the secondary core, a deep sleep power state. The method still further includes entering, by the last core, a system suspend state. The method also includes entering a boot state, by the last core, by restoring the last core context data.

20 Claims, 9 Drawing Sheets

(56) References Cited

U.S. PATENT DOCUMENTS

| | | | | |
|---|---|---|---|---|
| 2010/0057950 | A1 | 3/2010 | Barrow | |
| 2013/0238918 | A1 | 9/2013 | Haj-Yihia | |
| 2013/0326206 | A1* | 12/2013 | Lueck | G06F 1/32 713/1 |
| 2014/0059548 | A1 | 2/2014 | Ahmad et al. | |

FOREIGN PATENT DOCUMENTS

| | | | | | |
|---|---|---|---|---|---|
| DE | 112018004379 | T5 | * | 5/2020 | G06F 9/462 |
| JP | H08505965 | A | * | 6/1996 | G06F 9/463 |
| KR | 20090061636 | A | * | 6/2009 | G06F 9/461 |
| KR | 20110046719 | A | * | 5/2011 | G06F 9/5088 |

* cited by examiner

MULTI-CORE CLUSTER PROCESSING FOR SECURE SAVE AND RESTORE OPERATIONS DURING DEEP SLEEP POWER STATE

BACKGROUND

Field

Aspects of the present disclosure relate to multi-core cluster computing devices, and more specifically to processing for securely saving and restoring operations for deep sleep modes.

Background

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, and cores, such as central processing unit (CPU) devices, graphics processing unit (GPU) devices, neural processing unit (NPU) devices, digital signal processors (DSPs), and modems, among others.

As vehicles become more advanced, vehicles increasingly incorporate CPUs into their control systems. Automotive safety standards are very stringent with respect to wakeup/boot key performance indicators (KPIs) when the CPUs awaken from power saving modes. For example, core collapse, system collapse, cluster collapse, etc., may take 1 millisecond (ms) or even 5 ms to wake up with conventional low power mode processing. Such low power mode processing does not meet the strict criteria specified for vehicular systems. These modes also do not meet safety compliance specified in automotive silicon standards.

SUMMARY

In aspects of the present disclosure, a multi-core cluster computing method for securely saving and restoring context data includes storing, by a last core in a primary cluster, last core context data in a first memory. The method also includes storing, by a secondary core in a secondary cluster, secondary core context data in a second memory. The method further includes entering, by the secondary core, a deep sleep power state. The method still further includes entering, by the last core, a system suspend state. The method also includes entering a boot state, by the last core, by restoring the last core context data.

Other aspects of the present disclosure are directed to an apparatus. The apparatus has memory and one or more processors coupled to the memory. The processor(s) is configured to store, by a last core in a primary cluster, last core context data in a first memory type. The processor(s) is also configured to store, by a secondary core in a secondary cluster, secondary core context data in a second memory type. The processor(s) is further configured to enter, by the secondary core, a deep sleep power state. The processor(s) is still further configured to enter, by the last core, a system suspend state. The processor(s) is also further configured to enter a boot state, by the last core, by restoring the last core context data.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
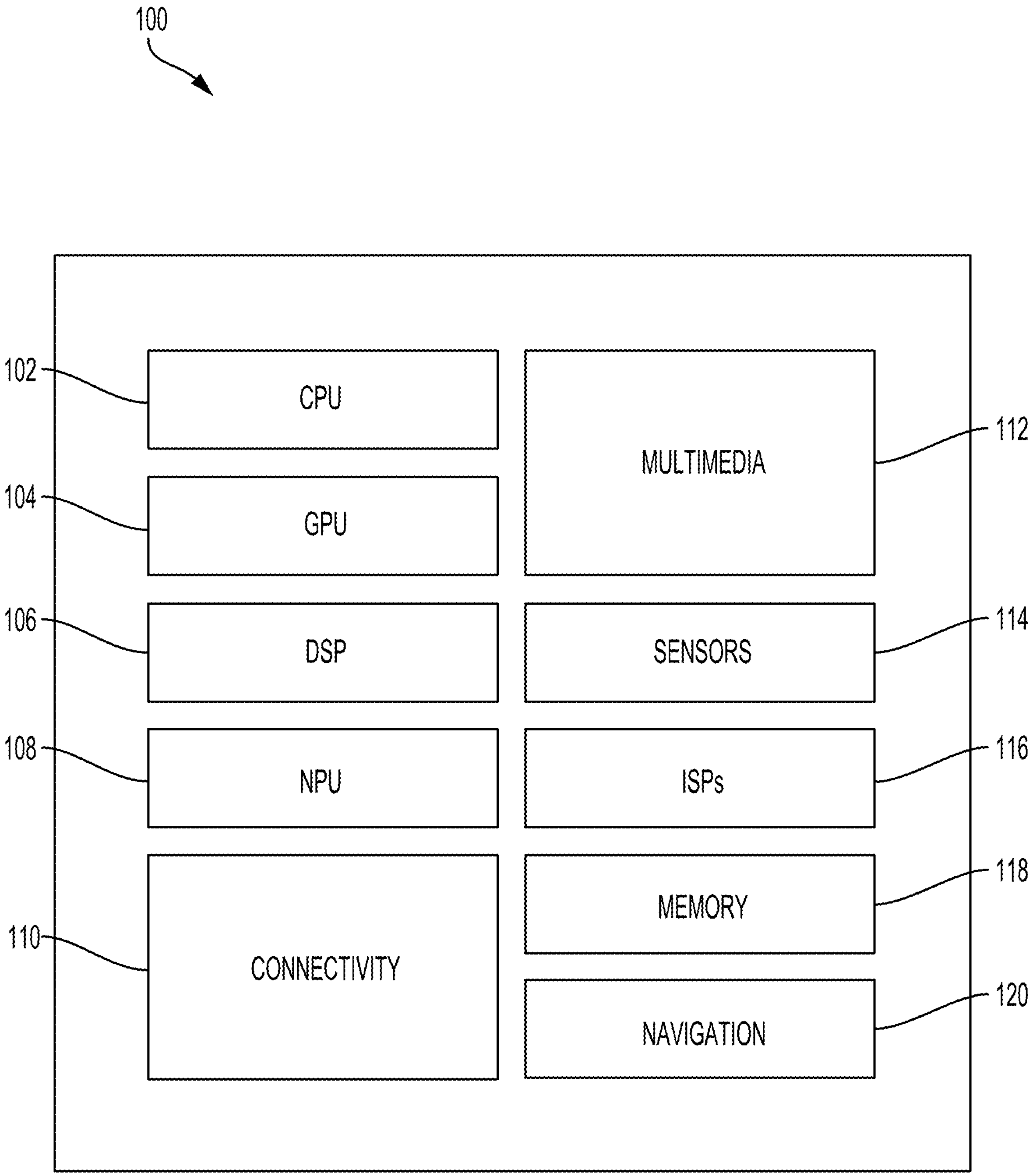
FIG. 1 is a block diagram illustrating an example implementation of a host system-on-a-chip (SoC), including a multi-core cluster architecture, in accordance with various aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

As vehicles become more advanced, vehicles increasingly incorporate central processing units (CPUs) into their control systems. Automotive safety standards are very stringent with respect to wakeup/boot key performance indicators (KPIs) when the CPUs awaken from power saving modes. For example, core collapse, system collapse, cluster collapse, etc., may take 1 millisecond (ms) or even 5 ms to wake up with conventional low power mode processing. Such low power mode processing does not meet the strict criteria specified for vehicular systems. These modes also do not meet safety compliance specified in automotive silicon standards.

A new power state called deep sleep (DS) has been introduced for long duration sleep cycles, such as when the ignition is off. For example, a vehicle may be off for long periods of time (e.g., weeks or even months) such that battery drain by system-on-a-chip (SoCs) becomes an issue. In the deep sleep power state, system-on-a-chip (SoC) devices, such as CPUs, are turned off, and the SoC state is saved to dynamic random access memory (DRAM) as part of deep sleep entry, taking advantage of double data rate (DDR) memory retention. That is, the DDR memory receives a minimum voltage for memory retention in the deep sleep power state, while the other hardware and logic are off. During a quick boot (QB) process when the SoC devices return from the deep sleep power state, the SoC devices restore the SoC state from the DRAM as part of deep sleep exit. A CPU subsystem (CPUSS) control processor configures the saving of context in the deep sleep state.

Aspects of the present disclosure address challenges in deep sleep and quick boot save and restore operations for core components in a multi-core cluster architecture. In some aspects, each core saves its own context in memory. The last core in all clusters saves its context in memory and also saves context for common region registers in the memory. After the context save operations, the cores enter the deep sleep (DS) power state. When the system awakens, quick boot (QB) processing begins, such that the first core restores its own configuration and context for any common region registers from the memory to hardware. While the cores other than the last core enable themselves during a pre-boot sequence, each of these cores coming online restores its own configuration.

In other aspects, secondary clusters (e.g., cluster 1 and cluster 2) save their context in an assigned memory partition upon entering the deep sleep state. The assigned memory partition does not retain a state when an SoC enters deep sleep. In these aspects, the last core reads the context data from the assigned memory partitions for the secondary clusters. The last core copies to memory the context data for the secondary clusters. The last core also reads cluster registers directly for the cores in its own cluster and saves this cluster context data in the memory. After the context save operations, all of the cores enter the deep sleep (DS) power state. When the system wakes up, quick boot (QB) processing causes the first core to restore the context for all the cores in its own cluster. Also, the first active core in each other cluster restores the context for all other cores in the same cluster. Thus, each individual core need not restore its own context and can instead boot in accordance with existing procedures.

In still other aspects, when a cluster enters deep sleep, all cores save their own context in a memory partition. The power source for the memory region is reconfigured so that the memory region does not fully power down during deep sleep. In the quick boot process, the power rails are returned to operational voltage because the memory cannot fully operate when powered by retention rails. The first core obtains data from the allocated memory via a software triggered direct memory access (DMA) to restore context for all cores in its cluster. The first active core in each other cluster also restores the context for all other cores in the same cluster via DMA processing.

Particular aspects of the subject matter described in this disclosure can be implemented to realize one or more of the following potential advantages. In some examples, the described techniques for entering and leaving deep sleep reduce latency when a system, such as a vehicular system, first turns on.

FIG. 1 illustrates an example implementation of a host system-on-a-chip (SoC) 100, which includes a multi-core cluster, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. Although not specifically shown, the multi-core CPU 102 may include multiple clusters. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

Figure 2:
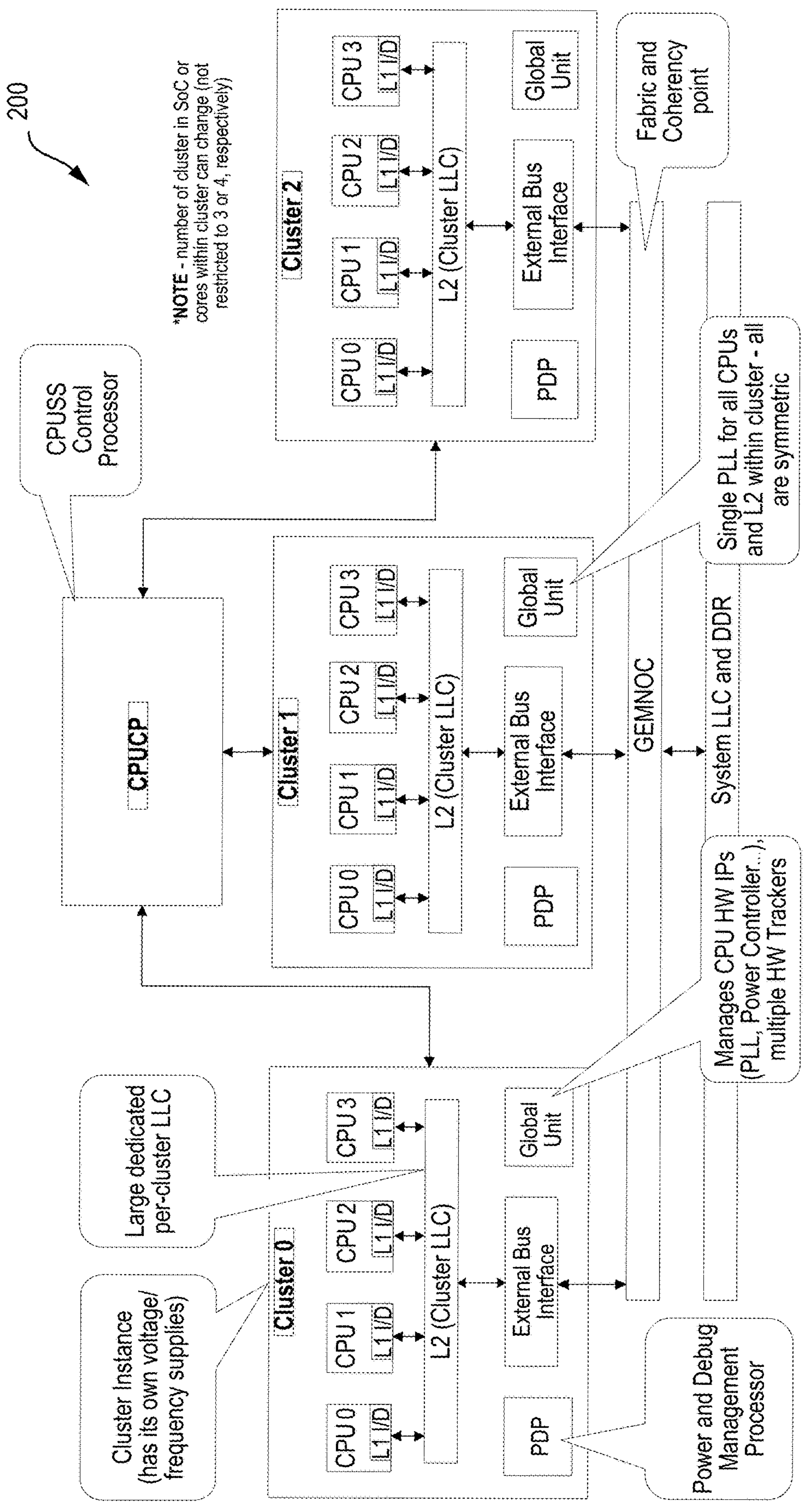
FIG. 2 is block diagram illustrating a multi-core cluster architecture, in accordance with various aspects of the present disclosure.
Figure 3:
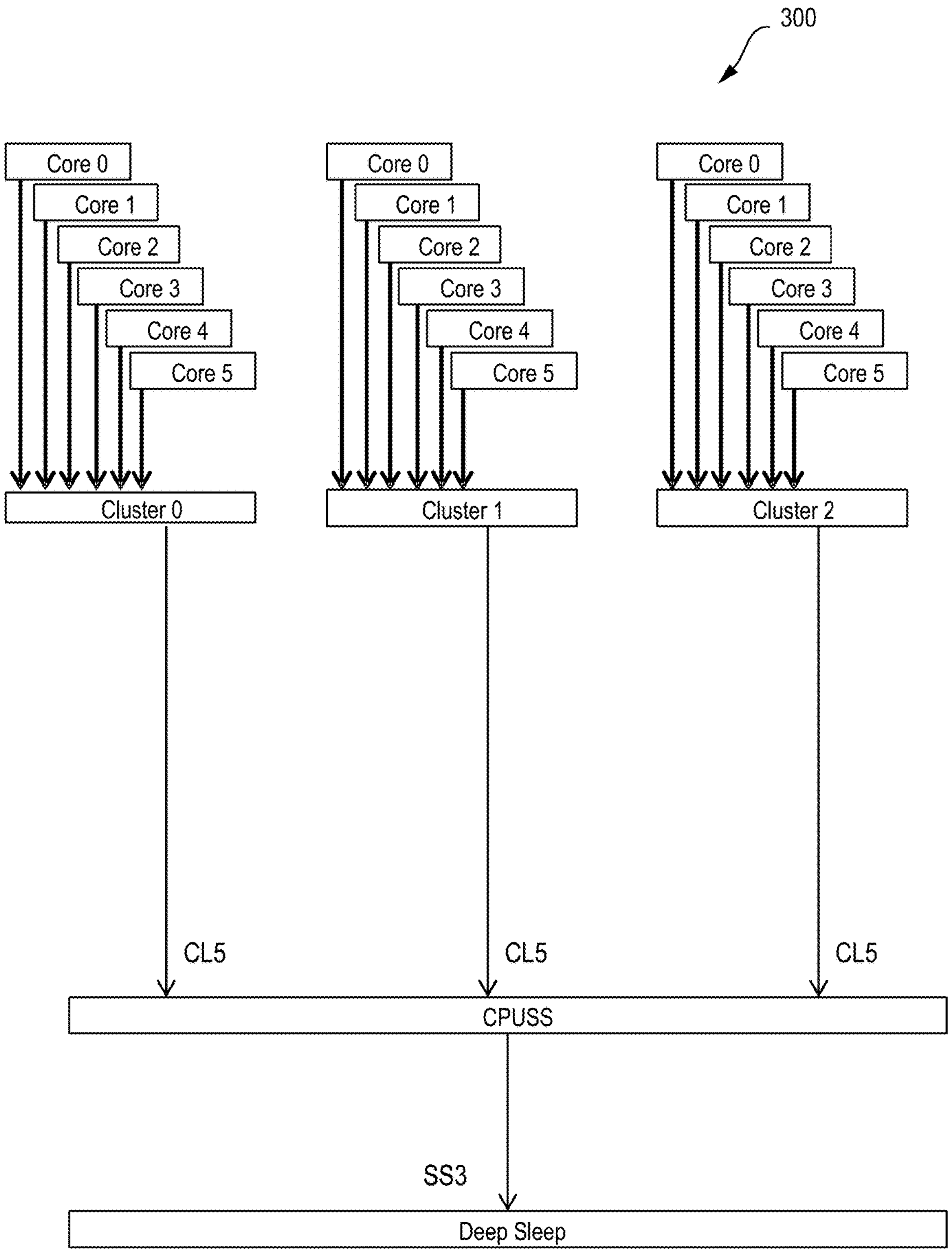
FIG. 3 is a block diagram illustrating a multi-core cluster power collapse sequence for a multi-core cluster architecture, in accordance with various aspects of the present disclosure.

According to aspects of the present disclosure, a mobile device includes a multi-core cluster architecture. The mobile device may include means for storing, means for entering, means for identifying, means for restoring, means for enabling, means for reading, means for copying, means for applying, and means for performing. In one configuration, the storing means, the entering means, the identifying means, the restoring means, the enabling means, the reading means, the copying means, the applying means and the performance means may be the CPU 102, GPU 104, DSP 106, NPU 108, memory 118, multi-core cluster architecture 200, and/or the multi-core cluster architecture 300, as shown in FIGS. 1-3. In other aspects, the aforementioned means may be any structure or any material configured to perform the functions recited by the aforementioned means.

As vehicles become more advanced, vehicles increasingly incorporate CPUs into their control systems. Automotive safety standards are very stringent with respect to wakeup/boot key performance indicators (KPIs) when the CPUs awaken from power saving modes. For example, core collapse, system collapse, cluster collapse, etc., may take 1 millisecond (ms) or even 5 ms to wake up with conventional low power mode processing. Such low power mode processing does not meet the strict criteria specified for vehicular systems. These modes also do not meet safety compliance specified in automotive silicon standards.

A new power state called deep sleep (DS) has been introduced for long duration sleep cycles, such as when the ignition is off. For example, a vehicle may be off for long periods of time (e.g., weeks or even months) such that battery drain by the CPUs becomes an issue. The deep sleep state is a low power mode that provides more power savings than traditional low power modes. In the deep sleep power state, system-on-a-chip (SoC) devices are turned off, and the SoC state is saved to dynamic random access memory (DRAM) as part of deep sleep entry, taking advantage of double data rate (DDR) memory retention. That is, the DDR memory remains operational in the deep slate power state, while the other hardware and logic are off. During a quick boot (QB) process when the SoC devices return from the deep sleep power state, the SoC devices restore the SoC state from the DRAM as part of deep sleep exit. A CPU subsystem (CPUSS) control processor configures the saving of context in the deep sleep state.

In the deep sleep power state, all subsystems are sent to their respective deepest low power state. A last core in a central processing unit (CPU) cluster configures the system level deep sleep mode for all other cores and saves the required context for different computing blocks. The last core allows the SoC to enter into the deep sleep state.

Aspects of the present disclosure address challenges in deep sleep and quick boot save and restore operations for core components in a multi-core cluster architecture.

FIG. 2 is a block diagram illustrating a multi-core cluster architecture 200, in accordance with various aspects of the present disclosure. The multi-core cluster architecture 200 includes a CPU subsystem (CPUSS) control processor (CPUCP) that communicates with each cluster (cluster 0, cluster 1, cluster 2). It is noted that the number of clusters within an SoC and the number of cores within a cluster is not restricted to three or four, as seen in the example of FIG. 2. Each cluster (cluster 0, cluster 1, cluster 2) includes multiple cores (CPU 0, CPU 1, CPU 2, CPU 3) and a last level two last level cache L2 LLC for the entire cluster. Each cluster (cluster 0, cluster 1, cluster 2) has its own voltage and frequency supplies, as well as a power and debug management processor (PDP. Global units within each cluster (cluster 0, cluster 1, cluster 2) include a phase lock loop (PLL) for all CPUs and the cache within each cluster. The global unit manages CPU hardware (HW) blocks (e.g., IPs) including a phase lock loop (PLL), power controller, activity monitor unit (AMU), performance monitor unit (PMU), and other hardware trackers. An external bus interface within each cluster (cluster 0, cluster 1, cluster 2) communicates with a fabric and coherency point gladiator and memory network on chip (GEMNOC) The fabric and coherency point (GEMNOC) communicates with a system last level cache and DDR memory.

FIG. 3 is a block diagram illustrating a multi-core cluster power collapse sequence for a multi-core cluster architecture 300, in accordance with various aspects of the present disclosure. The sequence is illustrated with respect to the cores in each cluster. In the multi-core cluster architecture 300 of FIG. 3, each cluster (cluster 0, cluster 1, cluster 2) includes six cores (core 0, core 1, core 2, core 3, core 4, core 5). Each cluster (cluster 0, cluster 1, cluster 2) communicates a cluster collapse signal (CL5) to a CPUSS, which may be the CPUCP of FIG. 2. The CPUSS indicates a system suspend (e.g., SS3) signal when all of the clusters (cluster 0, cluster 1, cluster 2) are in a deep sleep power state.

In order to enter the deep sleep power state, all N−1 (17 in the example of FIG. 3) cores turn off and send a power state coordination interface (PSCI) PSCI_CPU_OFF command. When all cores in a cluster are turned off, the cluster has entered a deepest supported idle state. A last core remains powered up. The CPU_OFF command sends each cluster (cluster 0, cluster 1, cluster 2) into their deepest idle states. In the example of FIG. 3, core 0 is considered to be the last core for the sake of simplicity and is the only core available at this point in time.

After all cores in cluster 1 and cluster 2 are power collapsed in response to receiving the CPU_OFF commands, cluster 1 and cluster 2 enter the deep sleep state (e.g., cluster collapse (CL5)) in which the power supplies (e.g., power rails) in the clusters turn off. As a result of the CLUSTER<x>_CX power rails turning off, all global units (e.g., local interrupt controller, PLL, etc.) within the clusters (cluster 1, cluster 2) but outside of the core domains are not accessible as they are sourced by the CLUSTER<x>_CX power rails. All secure and non-secure interrupts are migrated from the cores in the collapsed clusters (cluster 1, cluster 2).

In cluster 0, five cores are turned off, but the last core (core 0) remains active. The last core enters low power mode and sends a PSCI_SYSTEM_SUSPEND message. The last core attempts to save context of hardware blocks used in a secure environment. These hardware blocks may include a local generic interrupt controller (GIC), AMU, PMU, timers, etc.

Due to the power collapse of cluster 1 and cluster 2, the last core cannot access the cluster 1 and cluster 2 core components, e.g., generic interrupt control registers (GICRs). However, some architectures include a generic interrupt controller and a chip logic power rail (e.g., chip-CX rail) that remains active when the cluster powers down. In these architectures, the global entities (e.g., GICR) are sourced by a chip_CX rail. Thus, any core has read/write (R/W) access to this global entity region. For example, the last core can access the GICR in cluster 1 and cluster 2 in this type of architecture. In other architectures, the GICR is sourced by local cluster rails that are turned off (e.g., CLUSTER<x>_CX power rails), and thus the GICR is not accessible in those architectures. When exiting the deep sleep state and entering the quick boot state in architectures with a global interrupt controller that remains powered on, the last core (e.g., core 0) restores the configuration for all GICRs in all clusters. In architectures with a local interrupt controller that does not remain powered on, the last core cannot access the other cluster's core GICRs. Thus, the first active core in each cluster restores the other cores in that cluster. For example, if core 1 is the first core in cluster 1 coming online, then core 1 restores core 0 and cores 2-5 within cluster 1. More specifically, within a cluster, the N−1 cores are restored by core 0. The kernel issues a secure PSCI_CPU_ON<core_idx>call to trusted firmware to bring up the N−1 cores in a cold-boot process. Consequently, the kernel runs properly as the interrupt request (IRQ) configuration is intact in the same form the configuration was before entering the deep sleep state. Moreover, the save and restore operations for the components occur completely and securely in trusted firmware.

Figure 4:
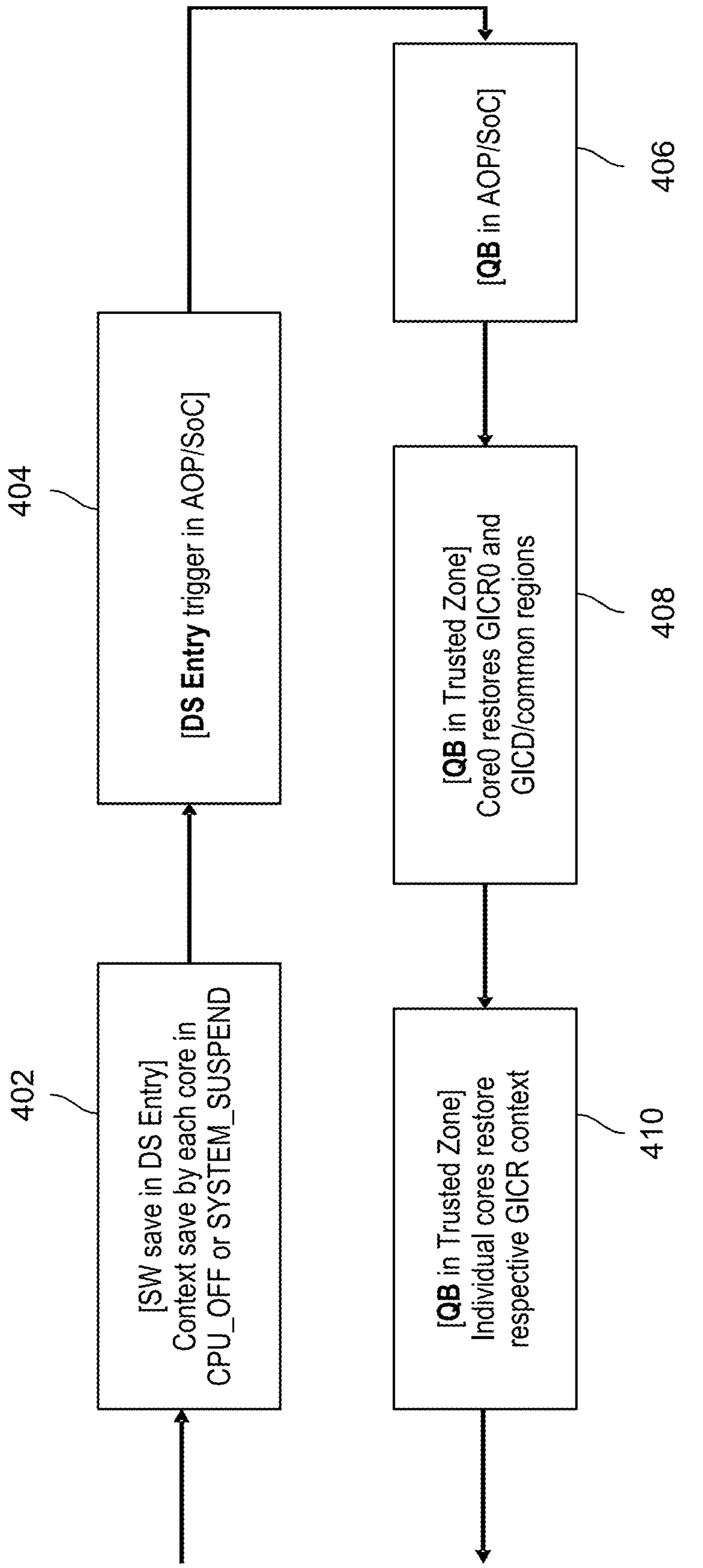
FIG. 4 is a block diagram illustrating a first solution for a multi-core cluster architecture to enter and exit a deep sleep state, in accordance with various aspects of the present disclosure.

FIG. 4 is a block diagram illustrating a first solution for a multi-core cluster architecture to enter and exit a deep sleep state, in accordance with various aspects of the present disclosure. In the example of FIG. 4, the system powers down all power sources when entering a deep sleep state. In the example of FIG. 4, each core saves its own context (e.g., GICR<x>context) in DDR memory at block 402. That is, a secure software (SW) save operation occurs when entering deep sleep such that each core saves context in response to a CPU_OFF command (for N−1 cores) or a SYSTEM_SUSPEND command (for the last core). The last core (e.g., core 0 in cluster 0 in FIG. 3) saves its context (e.g., the GICR0 context) in DDR memory and also saves context for common region registers in the DDR memory (e.g., context from global CPUSS blocks). After the context save operations, at block 404, the N−1 cores enter the deep sleep (DS) power state, and the last core configures a deep sleep state. Next, always-on firmware (e.g., always-on processor (AOP)) in the SoC coordinates deep sleep sequences (e.g., turning off logic and controlling multiplexor switching to retain DRAM configurations). In this solution, all cores identify the instructions to enter the deep sleep state and system suspend state based on the CPU_OFF and SYSTEM_SUSPEND commands.

When the system wakes up (e.g., a vehicle turns on), at block 406, quick boot (QB) processing begins in the always-on firmware in the SoC. At block 408, the process continues in a trusted zone (TZ) of the CPUSS, where the first core restores its own configuration (e.g., the GICR0 state) and context for any common region registers (e.g., generic interrupt controller distributor (GICD)) from the DDR memory to hardware (e.g., interrupt controller hardware, PMU hardware, AMU hardware, etc.). The quick boot operations of block 408 occur in trusted firmware (e.g., a trusted zone). When the process reaches the kernel (outside the secure region), the kernel sees that the context is already restored for the common regions and the first core.

While the N−1 cores enable themselves during a pre-boot sequence, at block 410, each N−1 core coming online restores its own configuration (e.g., GICR context). The quick boot operation of block 410 also occurs in the trusted zone. When the process reaches the kernel, the kernel see that the context is already restored for the N−1 cores. It is noted that blocks 408 and 410 are not limited to sequential operation. That is, either block 408 or block 410 may operate first, or they may operate in parallel.

The solution described with respect to FIG. 4 adds software complexity without introducing any hardware cost. The software latency may be observed for every core in the CPU_OFF path. No power penalty exists in deep sleep, and no low power mode synchronizations are specified. The kernel register view for collapsed cores differs from what was seen prior to deep sleep for secondary cores until the secondary cores are online.

Figure 5:
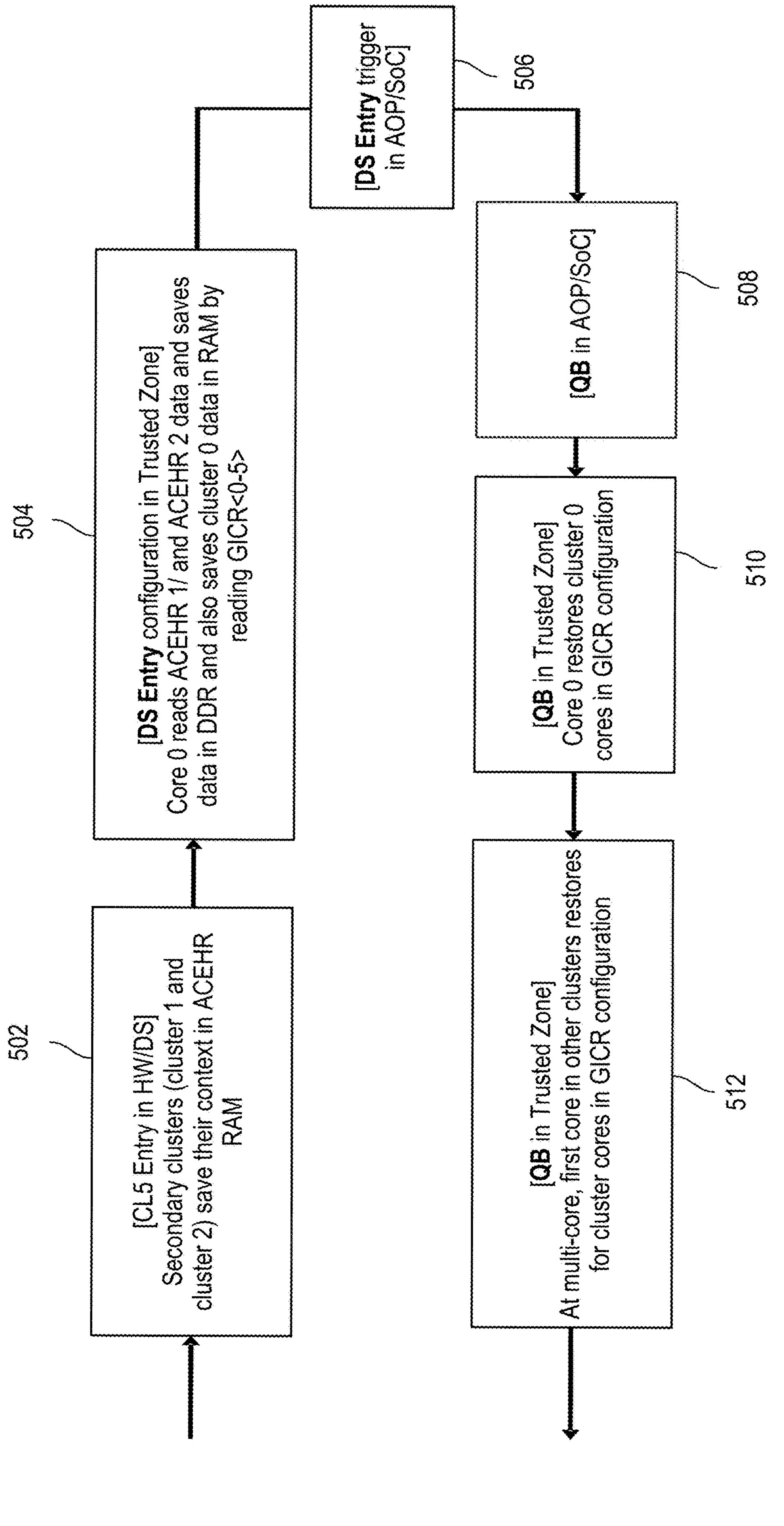
FIG. 5 is a block diagram illustrating a second solution for a multi-core cluster architecture to enter and exit a deep sleep state, in accordance with various aspects of the present disclosure.

FIG. 5 is a block diagram illustrating a second solution for a multi-core cluster architecture to enter and exit a deep sleep state, in accordance with various aspects of the present disclosure. In the example of FIG. 5, at block 502, secondary clusters (e.g., cluster 1 and cluster 2) save their context (e.g., generic interrupt controller (GIC) context) in an assigned memory partition before entering the deep sleep state (e.g., CL5 state). The assigned memory partition may be apps, copy, engine, hardware retention (ACEHR) random access memory (RAM). ACEHR RAM is a memory region reserved for each cluster for saving context. ACEHR RAM is retained when a cluster enters deep sleep, but not when the always on firmware finally coordinates deep sleep, at which point the memory storage is lost. That is, the ACER RAM is sourced by a chip logic power rail that turns off in deep sleep state. In some aspects, the secondary cores identify the instructions to enter the deep sleep state based on the CPU_OFF and SYSTEM_SUSPEND commands. In other aspects, the secondary cores receive triggers from a high level operating system (HLOS) to secure firmware to notify about deep sleep entry. The last core identifies the instructions to enter the deep sleep. The N−1 cores are not informed that deep sleep is planned as the N−1 cores are turned-off and the cluster enters the deep sleep state where context is saved irrespective of deep sleep entry. The last core entering deep sleep learns of the planned deep sleep in order to transition saved context from the ACEHR memory to DRAM, either based on a SYSTEM_SUSPEND call from the last core or based on triggers from the HLOS.

At block 504, the last core (e.g., core 0 from cluster 0) reads the context data from the assigned memory partitions for the secondary clusters (e.g., ACEHR 1 data for cluster 1 and ACEHR 2 data for cluster 2 data). The last core copies, to DDR memory, the context data for the secondary clusters with software processing. The last core also reads cluster registers directly for the cores in cluster 0 (e.g., GICR<0-5>) and saves this cluster context data in the DDR memory. The DDR memory is retained during the deep sleep state.

After the context save operations, at block 506, all of the cores enter the deep sleep (DS) power state, triggered by always-on firmware (e.g., AOP) in the SoC. When the system wakes up, at block 508, quick boot (QB) processing begins in the always-on firmware in the SoC. During quick boot processing in the trusted zone, at block 510, the last core restores the context (e.g., GICR configuration) for all the cores in its cluster (e.g., cluster 0). At block 512, the quick boot process continues in the trusted zone where the first active core in each other cluster (e.g., cluster 1 and cluster 2) restores the context for all other cores in the same cluster. Thus, each individual core need not restore its own context and can instead boot in accordance with existing procedures. For example, core 1 in cluster 1 restores the context for core 0 and cores 2-5 in cluster 1, and core 5 in cluster 2 restores the context for cores 0-4 in cluster 2. Although cores 1 and 5 are indicated as the first active core in clusters 1 and 2, the first active core could be any of the cores in a cluster.

The solution described with respect to FIG. 5 adds software complexity without introducing any hardware cost. The software latency may be observed with respect to the last core. Low power mode entry synchronization may be specified because the last core ensures the other clusters have entered deep sleep and saved their context. No power penalty exists in deep sleep. The kernel register view for collapsed cores is consistent with what was seen prior to deep sleep.

Figure 6:
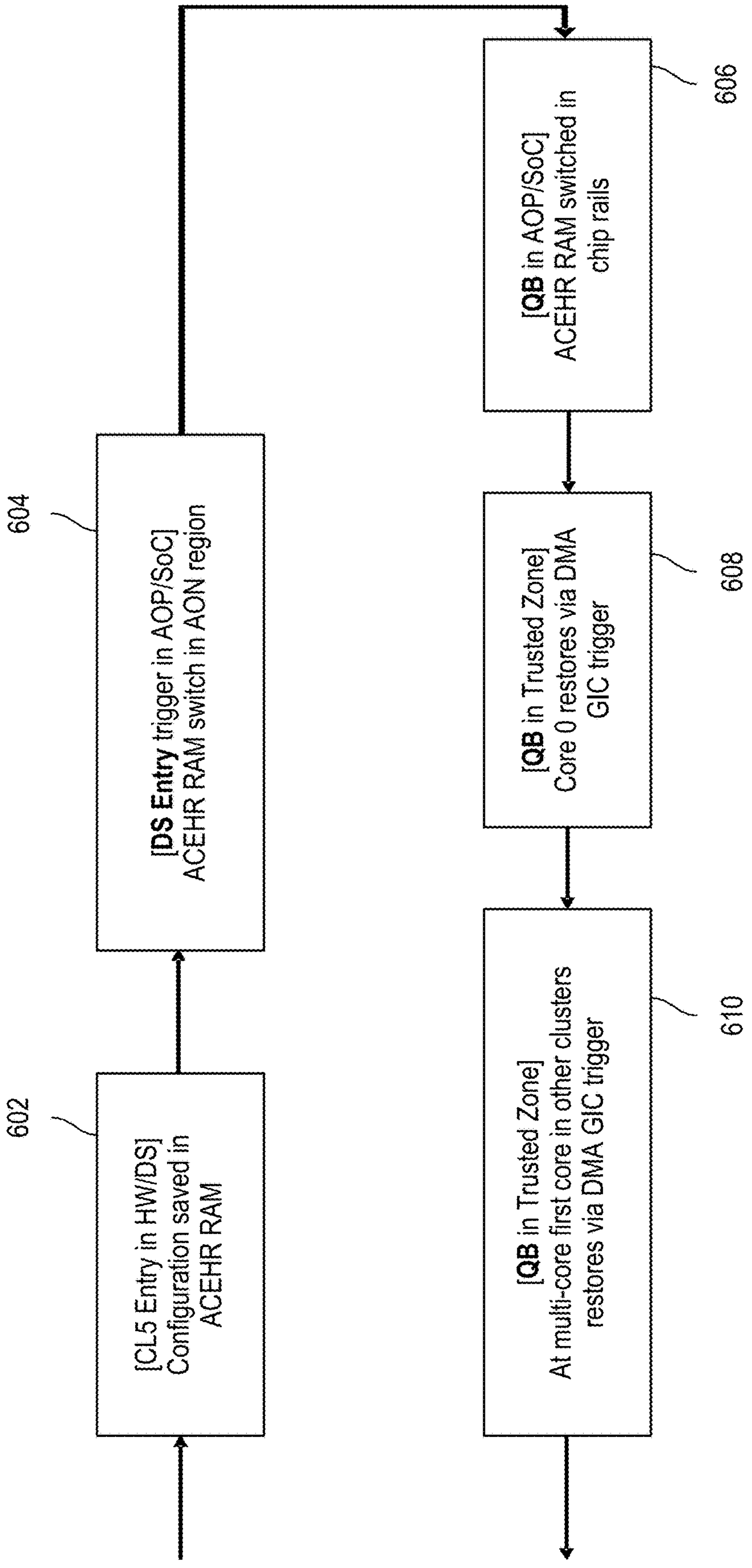
FIG. 6 is a block diagram illustrating a third solution for a multi-core cluster architecture to enter and exit a deep sleep state, in accordance with various aspects of the present disclosure.

FIG. 6 is a block diagram illustrating a third solution for a multi-core cluster architecture to enter and exit a deep sleep state, in accordance with various aspects of the present disclosure. In the example of FIG. 6, when a cluster enters deep sleep (e.g., a CL5 state) at block 602, all cores save their own context (e.g., GIC configuration) in a memory partition (e.g., ACEHR RAM). At block 604, the power source for the memory region (e.g., ACEHR RAM) is reconfigured by the always-on firmware so that the memory region does not fully power down during deep sleep. In other words, the ACEHR RAM moves into the always-on (AON) region. For example, retention flops can be implemented, or the power supplies may be switched to DDR retention operated power rails before entering the deep sleep state. Because this solution includes a hardened path in which the power supplies of local cluster memories are switched to power rails that remain on, the secure firmware is unaware of the deep sleep entry.

At block 606, in the always-on firmware quick boot process, the power rails are returned to operational voltage because the memory cannot fully operate when powered by retention rails. At block 608, in the trusted zone firmware, the last core obtains data from the allocated memory (e.g., ACER RAM) via a software triggered direct memory access (DMA) to restore context (e.g., GIC configuration) for all cores in the cluster (e.g., cluster 0). For example, a core may configure a control and status register (CSR) bit to enable the DMA transfer. During the DMA transfer, the core may continue executing other processes while the context is updating via DMA. At block 610, the quick boot process continues in the trusted zone where the first active core in each other cluster (e.g., cluster 1 and cluster 2) restores the context for all other cores in the same cluster in response to DMA software triggering.

The solution described with respect to FIG. 6 adds no software complexity but specifies hardware changes due to the power switching. No low power mode synchronizations are specified and little to no software latency is observed. This solution may incur a power penalty during deep sleep. The kernel register view for collapsed cores is in line with what was seen prior to deep sleep.

Figure 7:
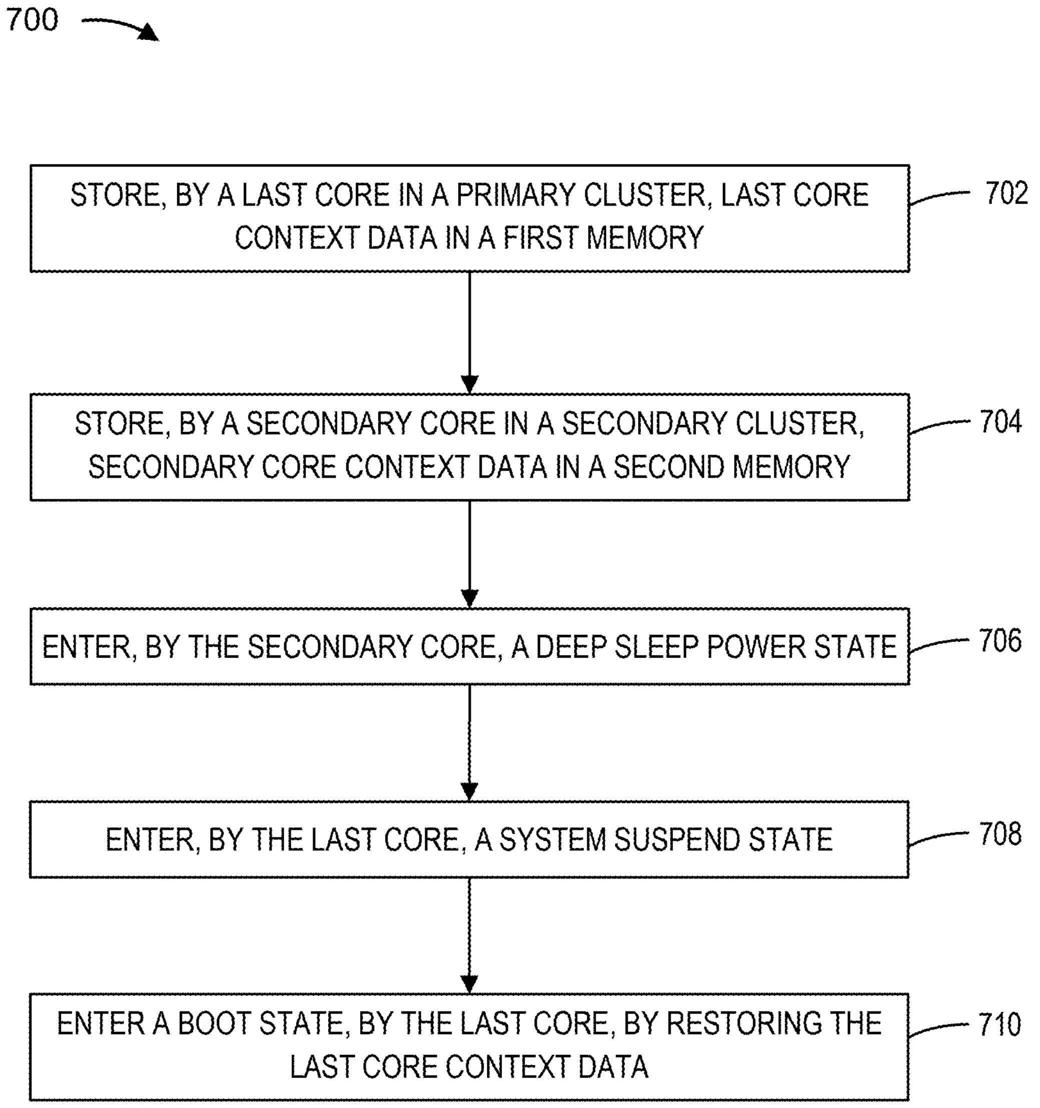
FIG. 7 is a flow diagram illustrating an example process performed, for example, by a multi-core cluster device, in accordance with various aspects of the present disclosure.

Aspects of the present disclosure introduce ideas for kernel drivers to save their context in secure firmware only as needed, without impacting regular idle state overhead. The aspects can be implemented in any CPUSS architecture and are kernel agnostic solutions. FIG. 7 is a flow diagram illustrating an example process 700 performed, for example, by a multi-core, multi-cluster device, in accordance with various aspects of the present disclosure. The example process 700 is an example of multi-core cluster processing for secure save and restore operations during deep sleep power state. As shown in FIG. 7, in some aspects, the process 700 may include storing, by a last core in a primary cluster, last core context data in a first memory (block 702). In some aspects, the last core stores common region context data in the first memory, prior to entering the deep sleep power state. In some aspects, the process 700 may include storing, by a secondary core in a secondary cluster, secondary core context data in a second memory (block 704). The last core context data and secondary core context data are securely saved and restored in firmware.

In some aspects, the process 700 may include entering, by the secondary core, a deep sleep power state (block 706). In some aspects, the process 700 may include entering, by the last core, a system suspend state (block 708).

In some aspects, the process 700 may include entering a boot state, by the last core, by restoring the last core context data (block 710). In some aspects, the last core enters the boot state by restoring additional primary cores in the primary cluster. In other aspects, entering the boot state by the last core further comprises restoring additional primary cores in the primary cluster. In still other aspects, entering the boot state by the last core includes performing a first direct memory access (DMA) operation, and performing a second DMA operation.

Figure 8:
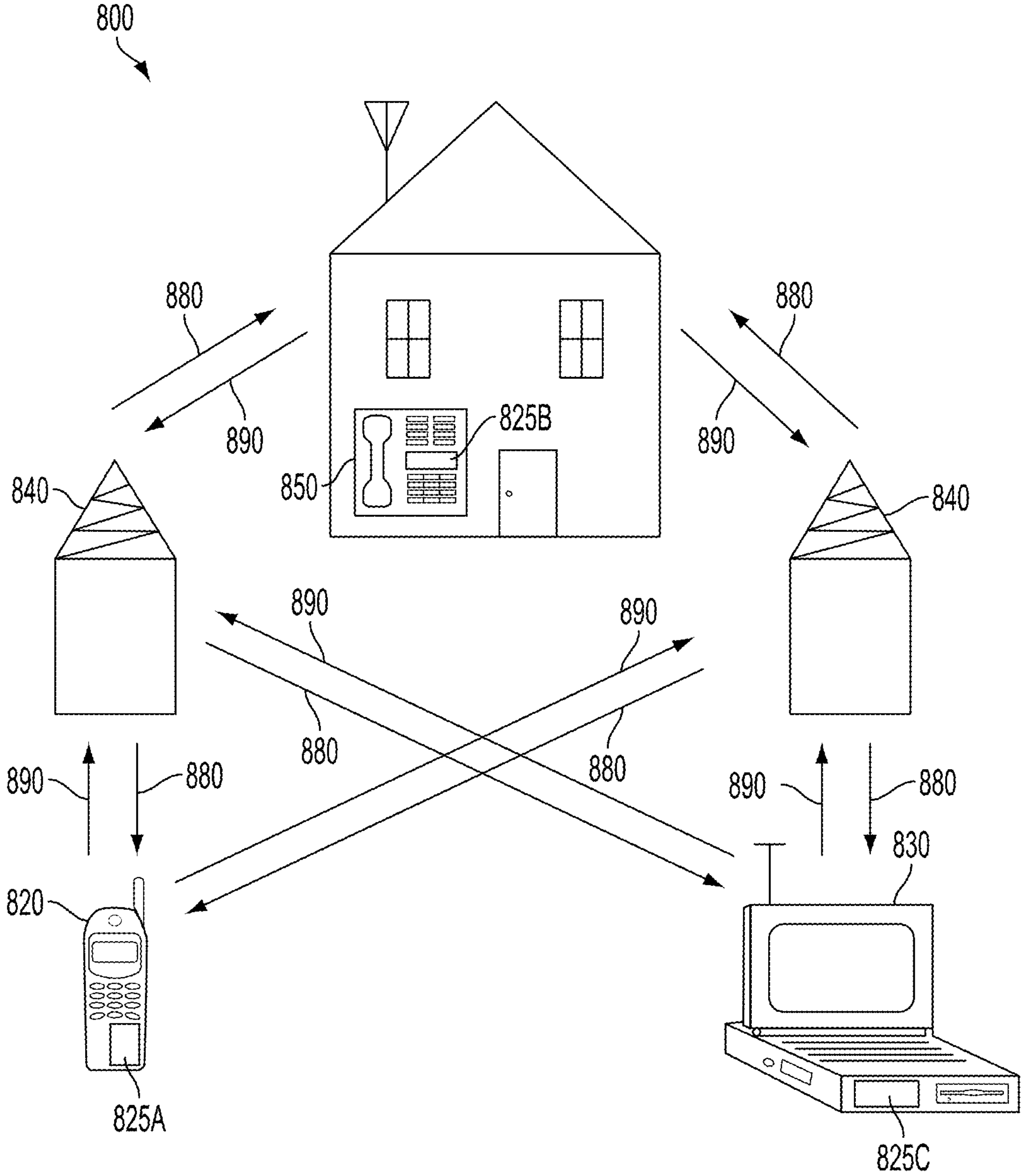
FIG. 8 is a block diagram showing an exemplary wireless communications system in which a configuration of the present disclosure may be advantageously employed.

FIG. 8 is a block diagram showing an exemplary wireless communications system 800, in which an aspect of the present disclosure may be advantageously employed. For purposes of illustration, FIG. 8 shows three remote units 820, 830, and 850, and two base stations 840. It will be recognized that wireless communications systems may have many more remote units and base stations. Remote units 820, 830, and 850 include integrated circuit (IC) devices 825A, 825B, and 825C that include the disclosed multi-core cluster. It will be recognized that other devices may also include the disclosed multi-core cluster, such as the base stations, switching devices, and network equipment. FIG. 8 shows forward link signals 880 from the base stations 840 to the remote units 820, 830, and 850, and reverse link signals 890 from the remote units 820, 830, and 850 to the base stations 840.

In FIG. 8, remote unit 820 is shown as a mobile telephone, remote unit 830 is shown as a portable computer, and remote unit 850 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 8 illustrates remote units according to the aspects of the present disclosure, the disclosure is not limited to these exemplary illustrated units. Aspects of the present disclosure may be suitably employed in many devices, which include the disclosed multi-core cluster.

Figure 9:
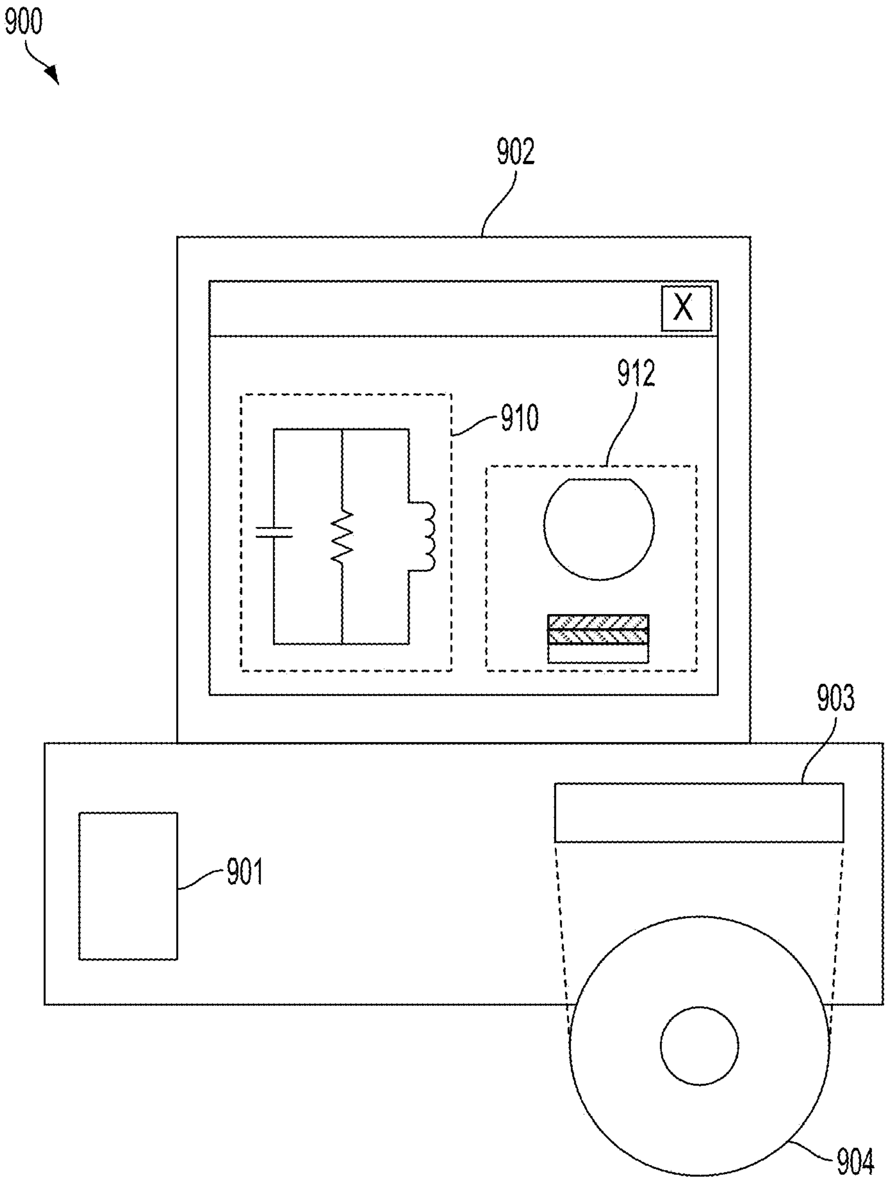
FIG. 9 is a block diagram illustrating a design workstation used for circuit, layout, and logic design of components, in accordance with various aspects of the present disclosure.

FIG. 9 is a block diagram illustrating a design workstation 900 used for circuit, layout, and logic design of a semiconductor component, such as the multi-core cluster disclosed above. The design workstation 900 includes a hard disk 901 containing operating system software, support files, and design software such as Cadence or OrCAD. The design workstation 900 also includes a display 902 to facilitate design of a circuit 910 or a semiconductor component 912, such as the multi-core cluster. A storage medium 904 is provided for tangibly storing the design of the circuit 910 or the semiconductor component 912 (e.g., the PLD). The design of the circuit 910 or the semiconductor component 912 may be stored on the storage medium 904 in a file format such as GDSII or GERBER. The storage medium 904 may be a CD-ROM, DVD, hard disk, flash memory, or other appropriate device. Furthermore, the design workstation 900 includes a drive apparatus 903 for accepting input from or writing output to the storage medium 904.

Data recorded on the storage medium 904 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 904 facilitates the design of the circuit 910 or the semiconductor component 912 by decreasing the number of processes for designing semiconductor wafers.

Example Aspects

Aspect 1: A multi-core cluster computing method for securely saving and restoring context data, comprising: storing, by a last core in a primary cluster, last core context data in a first memory; storing, by a secondary core in a secondary cluster, secondary core context data in a second memory; entering, by the secondary core, a deep sleep power state; entering, by the last core, a system suspend state; and entering a boot state, by the last core, by restoring the last core context data.

Aspect 2: The method of Aspect 1, further comprising: identifying a first instruction to enter the deep sleep power state by the last core; identifying second instructions to enter the deep sleep power state by the secondary cores; storing, by the last core, common region context data in the first memory, prior to entering the deep sleep power state; restoring, by the last core, common region context data when entering the boot state; enabling the secondary core; and entering the boot state, by the enabled secondary core, by restoring the secondary core context data from the second memory.

Aspect 3: The method of Aspect 1, in which the second memory is sourced by a power rail that turns off during the deep sleep power state and the first memory retains state during the deep sleep power state, and the method further comprises: identifying a first instruction to enter the deep sleep power state by the last core; reading, by the last core, the secondary core context data from the second memory; and copying, by the last core, the secondary core context data into the first memory, prior to entering the deep sleep power state.

Aspect 4: The method of any Aspects 1 or 3, in which entering the boot state, by the last core, further comprises restoring additional primary cores in the primary cluster.

Aspect 5: The method of any of the preceding Aspects 1, 3, or 4, further comprising entering the boot state, by the secondary core, by restoring remaining secondary cores in the secondary cluster.

Aspect 6: The method of Aspect 1, in which the first memory and the second memory are coupled to a power source that collapses during the deep sleep power state, and the method further comprises: applying retention voltage to the first memory and the second memory to retain state while in the deep sleep power state before the last core and the secondary core enter the deep sleep power state; and applying operational voltage to the first memory and the second memory when the last core and the secondary core enter the boot state.

Aspect 7: The method of Aspects 1 or 6, in which entering the boot state by the last core further comprises restoring additional primary cores in the primary cluster.

Aspect 8: The method of Aspects 1, 6, or 7, further comprising entering the boot state, by the secondary core, by restoring remaining secondary cores in the secondary cluster.

Aspect 9: The method of Aspects 1, 6, 7, or 8, in which entering the boot state by the last core includes performing a first direct memory access (DMA) operation, and entering the boot state by the last core includes performing a second DMA operation.

Aspect 10: The method of any of the preceding Aspects, in which the last core context data and the secondary core context data are securely saved and restored in firmware.

Aspect 11: An apparatus, comprising: at least one memory; and at least one processor coupled to the at least one memory, the at least one processor configured: to store, by a last core in a primary cluster, last core context data in a first memory type; to store, by a secondary core in a secondary cluster, secondary core context data in a second memory type; to enter, by the secondary core, a deep sleep power state; to enter, by the last core, a system suspend state; and to enter a boot state, by the last core, by restoring the last core context data.

Aspect 12: The apparatus of Aspect 11, in which the at least one processor is further configured: to identify a first instruction to enter the deep sleep power state by the last core; to identify second instructions to enter the deep sleep power state by the secondary cores; to store, by the last core, common region context data in the first memory type, prior to entering the deep sleep power state; to restore, by the last core, common region context data when entering the boot state; to enable the secondary core; and to enter the boot state, by the enabled secondary core, by restoring the secondary core context data from the second memory type.

Aspect 13: The apparatus of Aspect 11, in which the second memory type is sourced by a power rail that turns off during the deep sleep power state and the first memory type retains state during the deep sleep power state, and the at least one processor is further configured: to identify a first instruction to enter the deep sleep power state by the last core; to read, by the last core, the secondary core context data from the second memory type; and to copy, by the last core, the secondary core context data into the first memory type, prior to entering the deep sleep power state.

Aspect 14: The apparatus of Aspects 11 or 13, in which the at least one processor is further configured to restore additional primary cores in the primary cluster.

Aspect 15: The apparatus of any of the Aspects 11, 13 or 14, in which the at least one processor is further configured to restore remaining secondary cores in the secondary cluster.

Aspect 16: The apparatus of Aspect 11, in which the first memory type and the second memory type are coupled to a power source that collapses during the deep sleep power state, and the at least one processor is further configured: to apply retention voltage to the first memory type and the second memory type to retain state while in the deep sleep power state before the last core and the secondary core enter the deep sleep power state; and to apply operational voltage to the first memory type and the second memory type when the last core and the secondary core enter the boot state.

Aspect 17: The apparatus of any of the Aspects 11 or 16, in which the at least one processor is further configured to restore additional primary cores in the primary cluster.

Aspect 18: The apparatus of any of the Aspects 11 or 16-17, in which the at least one processor is further configured to restore remaining secondary cores in the secondary cluster.

Aspect 19: The apparatus of any of the Aspects 11 or 16-18, in which the at least one processor is further configured to perform a first direct memory access (DMA) operation, and perform a second DMA operation.

Aspect 20: The apparatus of any of the Aspects 11-19, in which the last core context data and the secondary core context data are securely saved and restored in firmware.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A multi-core cluster computing method for securely saving and restoring context data, comprising:

storing, by a last core in a primary cluster, last core context data in a first memory;

storing, by a secondary core in a secondary cluster, secondary core context data in a second memory;

entering, by the secondary core, a deep sleep power state;

entering, by the last core, a system suspend state; and entering a boot state, by the last core, by restoring the last core context data.

2. The method of claim 1, further comprising:

identifying a first instruction to enter the deep sleep power state by the last core;

identifying second instructions to enter the deep sleep power state by the secondary cores;

storing, by the last core, common region context data in the first memory, prior to entering the deep sleep power state;

restoring, by the last core, common region context data when entering the boot state;

enabling the secondary core; and entering the boot state, by the enabled secondary core, by restoring the secondary core context data from the second memory.

3. The method of claim 1, in which the second memory is sourced by a power rail that turns off during the deep sleep power state and the first memory retains state during the deep sleep power state, and the method further comprises:

identifying a first instruction to enter the deep sleep power state by the last core;

reading, by the last core, the secondary core context data from the second memory; and copying, by the last core, the secondary core context data into the first memory, prior to entering the deep sleep power state.

4. The method of claim 3, in which entering the boot state, by the last core, further comprises restoring additional primary cores in the primary cluster.

5. The method of claim 3, further comprising entering the boot state, by the secondary core, by restoring remaining secondary cores in the secondary cluster.

6. The method of claim 1, in which the first memory and the second memory are coupled to a power source that collapses during the deep sleep power state, and the method further comprises:

applying retention voltage to the first memory and the second memory to retain state while in the deep sleep power state before the last core and the secondary core enter the deep sleep power state; and applying operational voltage to the first memory and the second memory when the last core and the secondary core enter the boot state.

7. The method of claim 6, in which entering the boot state by the last core further comprises restoring additional primary cores in the primary cluster.

8. The method of claim 7, further comprising entering the boot state, by the secondary core, by restoring remaining secondary cores in the secondary cluster.

9. The method of claim 8, in which entering the boot state by the last core includes performing a first direct memory access (DMA) operation, and entering the boot state by the last core includes performing a second DMA operation.

10. The method of claim 1, in which the last core context data and the secondary core context data are securely saved and restored in firmware.

11. An apparatus, comprising:

at least one memory; and at least one processor coupled to the at least one memory, the at least one processor configured:

to store, by a last core in a primary cluster, last core context data in a first memory type;

to store, by a secondary core in a secondary cluster, secondary core context data in a second memory type;

to enter, by the secondary core, a deep sleep power state;

to enter, by the last core, a system suspend state; and to enter a boot state, by the last core, by restoring the last core context data.

12. The apparatus of claim 11, in which the at least one processor is further configured:

to identify a first instruction to enter the deep sleep power state by the last core;

to identify second instructions to enter the deep sleep power state by the secondary cores;

to store, by the last core, common region context data in the first memory type, prior to entering the deep sleep power state;

to restore, by the last core, common region context data when entering the boot state;

to enable the secondary core; and to enter the boot state, by the enabled secondary core, by restoring the secondary core context data from the second memory type.

13. The apparatus of claim 11, in which the second memory type is sourced by a power rail that turns off during the deep sleep power state and the first memory type retains state during the deep sleep power state, and the at least one processor is further configured:

to identify a first instruction to enter the deep sleep power state by the last core;

to read, by the last core, the secondary core context data from the second memory type; and to copy, by the last core, the secondary core context data into the first memory type, prior to entering the deep sleep power state.

14. The apparatus of claim 13, in which the at least one processor is further configured to restore additional primary cores in the primary cluster.

15. The apparatus of claim 13, in which the at least one processor is further configured to restore remaining secondary cores in the secondary cluster.

16. The apparatus of claim 11, in which the first memory type and the second memory type are coupled to a power source that collapses during the deep sleep power state, and the at least one processor is further configured:

to apply retention voltage to the first memory type and the second memory type to retain state while in the deep sleep power state before the last core and the secondary core enter the deep sleep power state; and to apply operational voltage to the first memory type and the second memory type when the last core and the secondary core enter the boot state.

17. The apparatus of claim 16, in which the at least one processor is further configured to restore additional primary cores in the primary cluster.

18. The apparatus of claim 17, in which the at least one processor is further configured to restore remaining secondary cores in the secondary cluster.

19. The apparatus of claim 18, in which the at least one processor is further configured to perform a first direct memory access (DMA) operation, and perform a second DMA operation.

20. The apparatus of claim 11, in which the last core context data and the secondary core context data are securely saved and restored in firmware.

* * * * *